US012669795B2

(12) United States Patent
Zhang et al.

(10) Patent No.: US 12,669,795 B2
(45) Date of Patent: Jun. 30, 2026

(54) TOOL WEAR MONITORING METHOD AND SYSTEM UNDER VARIABLE OPERATIONAL CONDITIONS BASED ON DECOUPLING OF CUTTING FORCE COMPONENT

(71) Applicant: Xi'an Jiaotong University, Xi'an (CN)

(72) Inventors: Jun Zhang, Xi'an (CN); Lele Bai, Xi'an (CN); Yuyang Tang, Xi'an (CN); Huijie Zhang, Xi'an (CN); Wanhua Zhao, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 371 days.

(21) Appl. No.: 18/486,671

(22) Filed: Oct. 13, 2023

(65) Prior Publication Data

US 2024/0036543 A1    Feb. 1, 2024

Related U.S. Application Data

(63) Continuation of application No. PCT/CN2022/108646, filed on Jul. 28, 2022.

(30) Foreign Application Priority Data

Jun. 27, 2022    (CN) .......................... 202210736994.8

(51) Int. Cl.
G05B 19/404        (2006.01)
G05B 19/18          (2006.01)
G05B 19/4069      (2006.01)

(52) U.S. Cl.
CPC ......... G05B 19/404 (2013.01); G05B 19/182 (2013.01); G05B 19/4069 (2013.01)

(58) Field of Classification Search
None
See application file for complete search history.

(56) References Cited

FOREIGN PATENT DOCUMENTS

| | | | | |
|---|---|---|---|---|
| CN | 102564786 A | 7/2012 | | |
| CN | 111761409 A | 10/2020 | | |
| CN | 111644900 B | * | 11/2021 | ............. B23Q 17/09 |
| CN | 113780153 A | 12/2021 | | |

* cited by examiner

*Primary Examiner* — Sean Shechtman
(74) *Attorney, Agent, or Firm* — Nitin Kaushik

(57) ABSTRACT

The present disclosure discloses a tool wear monitoring method and system under variable operational conditions based on the decoupling of cutting force component. Spindle vibration data of a machine tool is acquired, a data set with labeled tool name information is established according to the machine internal data, a cutting force acting on the tool is estimated in real time based on a vibration signal, and the actual cutting force increased due to tool wear and the maximum allowable theoretical cutting force increased due to tool wear under the surface roughness constraint are calculated. The present disclosure enables tool wear monitoring under variable loads to determine in real time whether the excessive wear occurs based on the part accuracy constraint, and can maximize the service life of the tool.

8 Claims, 5 Drawing Sheets

TOOL WEAR MONITORING METHOD AND SYSTEM UNDER VARIABLE OPERATIONAL CONDITIONS BASED ON DECOUPLING OF CUTTING FORCE COMPONENT

CROSS-REFERENCE TO RELATED APPLICATIONS

The application claims priority to Chinese patent application No. 202210736994.8, filed on Jun. 27, 2022, the entire contents of which are incorporated herein by reference.

TECHNICAL FIELD

The present disclosure belongs to the field of condition monitoring and diagnostic control in a cutting process of a numerically controlled machine tool, and more particularly relates to a tool wear monitoring method and system under variable operational conditions based on the decoupling of cutting force component.

BACKGROUND

In both academic and engineering applications, the technology for indirect monitoring of the tool wear states during the cutting process has been a hot spot for many years in intelligent machining. In terms of engineering applications, commercial tool condition monitoring systems such as ARTIS enable tool anomaly monitoring in high batch machining applications based on a bandwidth monitoring strategy (dynamic threshold strategy). A bandwidth monitoring method utilizes coupled information containing contributions of the cutting process and the tool wear state. The method avoids the disturbing influence of the cutting parameter on the monitoring index by first learning online the monitoring index containing information of the operational condition parameter and setting the maximum allowable fluctuation interval of the abnormal monitoring on this basis. However, due to the random nature of the cutting process, this monitoring method is very sensitive to the setting of upper and lower failure thresholds, and is prone to false or missed alarms in terms of tool wear monitoring. Frequent false alarms can affect machining efficiency, and missed alarms can cause parts to fail.

In a real cutting process, considering the machining efficiency and other factors, rough machining and finish machining are often completed with one tool, and the tool may experience a large difference in the combination of cutting parameters during wear degradation. Rough machining uses a relatively saturated amount of cutting to ensure the cutting efficiency as much as possible, and finish machining has smaller chosen cutting parameters to ensure the machining precision of the part. In addition, the feed speed is often reduced at pocket corners, annular thin walls, T-shaped thin walls, etc., to ensure that the cutting process remains as stable as possible. Since the cutting parameters are time-varying during real machining, this results in that the information in the data monitored by the sensor, which reflects the degradation of the tool wear, is modulated by the cutting conditions, which greatly interferes with the accurate monitoring of the tool wear states.

The state data of the machine tool during the cutting process can be collected by various types of sensors (vibration, current, displacement, cutting force, etc.), which contain a large amount of sensitive information reflecting the tool wear. While this state data contains a great deal of useful information about tool wear, it also contains information about fluctuations in the monitoring signal caused by variations in operational condition parameters. The tool wear state and cutting parameters exhibit a high degree of coupling to the sensor signal, and information reflecting changes in tool wear state is swamped in amplitude fluctuations of operational condition parameter changes. Any type of sensor has the above problems.

Therefore, refining (purifying) the components reflecting tool wear from the original signals of sensors with complex information components is the key to solving the problem of tool wear under time-varying cutting conditions. Tool condition monitoring with variable cutting parameters is essentially a variable load problem with various factors superimposed. The above problems are common problems in the field of fault diagnosis and condition monitoring under variable operational conditions.

Modern signal processing and decomposition methods can decompose complex signal components into different frequency bands, and fault diagnosis and analysis can be achieved by extracting statistical features for the frequency band in which the fault is located. The application No. 202011566473. X discloses a model fusion tool wear monitoring method and system based on power and vibration signals, which realizes tool wear monitoring by extracting various time-frequency domain indexes and performing feature fusion and dimension reduction. The application No. 202111308074.8 provides a tool wear prediction method based on multi-sensor feature fusion, which uses force, vibration, and the acoustic emission sensor to monitor and collect various signal, and analyzes and extracts features in time domain, frequency domain and time-frequency domain for tool wear monitoring. However, although methods based on wavelet packet decomposition and reconstruction, empirical mode decomposition, second generation wavelet decomposition and variational mode decomposition can separate tool wear information to a certain extent, it is difficult to effectively separate most fault signals, resulting in low signal-to-noise ratio of extracted fault features. The wear features extracted by these methods may also be disturbed by operational condition parameters.

In recent years, deep learning has shown strong advantages in feature extraction, which can adaptively extract virtual features from the original signals to represent the degree of tool wear. The application publication number CN107877262A discloses a tool wear monitoring method for a numerically controlled machine tool based on deep learning, which can quickly and accurately identify the wear states of various tools under different machining conditions. The application publication number CN107877262A discloses a tool wear prediction method based on a deep convolution residual shrinkage network. Based on preprocessing the collected machine tool vibration, cutting force and motor current signals, a residual shrinkage unit is constructed to extract the deep-seated features of input signals and filter noise interference. A tool wear prediction model based on the deep convolution residual shrinkage network is constructed. However, on one hand, this feature extraction method needs a lot of training data, and it is difficult to obtain sample data in actual industrial production. In addition, the deep learning model has insufficient interpretability and generalization ability. When the cutting condition changes, the recognition accuracy of the model will drop sharply. This method needs further study in solving the problem of tool wear condition monitoring under time-varying operational conditions.

It is also a feasible method to study tool wear monitoring under variable cutting parameters by combining a cutting force model with real-time data. In the cutting force model, the milling force coefficient is related to the tool geometry and operational conditions, which is used by scholars to study the tool wear monitoring. Assuming that the workpiece material, tool and cooling conditions are constant, the cutting force coefficient is related to the geometric parameters of the tool. The cutting force coefficient can be identified by a milling force model and actual forces measured by dynamometer. The edge force coefficient reflecting the ploughing effect is most related to tool wear, and is less affected by the cutting parameters. The application number 202111403696.9 discloses a variable operational condition tool wear monitoring method driven by the fusion of force model and data, and proposes to use an indirectly measured cutting force to identify the milling force coefficient in real time to realize tool wear monitoring under the variable operational condition. However, this method needs to identify the milling force coefficient by changing the feed per tooth, which has certain requirements for the cutting condition. In addition, the method of obtaining the cutting force indirectly in multi-axis cutting makes the identification of the milling force coefficient more complicated.

In view of the above, the existing tool wear monitoring methods have the following disadvantages:

(1) The contributions of the tool wear and the cutting parameter on the monitoring signal are not studied from the perspective of signal components. The contributions of tool wear are not fully decoupled and separated from original signals, such as the time-frequency domain statistical features are extracted to realize tool wear monitoring under the variable operational conditions.

(2) Because of the inconsistency of the quantity grades of the monitoring indexes proposed by the existing methods, it is complicated to set different tool wear thresholds. There are rough machining, finish machining and other occasions in the production site. In addition, titanium alloy, aluminum alloy and other different materials machined needs many kinds of tools, which brings difficulties to the tool wear threshold.

(3) In setting of the tool wear threshold, the machining accuracy is not combined with tool wear monitoring. The tool wear threshold is often evaluated by the width of a flank wear band, but the tool wear process is complex, so it is difficult to measure it by a single tool parameter.

SUMMARY

An objective of the present disclosure is to provide a tool wear monitoring method and system under variable operational conditions based on wear-induced cutting force component to solve the problem of the tool wear monitoring in a manufacturing workshop.

To achieve the above objective, the present disclosure adopts the following technical solutions:

A tool wear monitoring method under variable operational conditions based on the decoupling of cutting force component, including the steps of:

step S1: acquiring a tool location source file TLSF according to structural features of a part;

step S2: inputting TLSF into a cutting physical simulation model to extract and calculate a tool-workpiece-engagement (TWE);

step S3: acquiring a cross-point frequency response function FRF of a tool tip of a machine tool and a sensor mounting position by means of a hammer-hit method;

step S4: calculating a maximum allowable tool tip excitation force at each position of the part during a cutting process based on the conversion of surface roughness Ra of a certain step of the machined part into a surface position error parameter SLE; calculating, based on a machine tool accuracy factor, a maximum allowable cutting force limit value due to tool wear;

step S5: acquiring spindle vibration data of a cutting process of a numerical control machine tool, and establishing a data set with labeled tool name information according to the acquired data;

step S6: performing trend-term removing and low-pass filtering on the labeled spindle vibration data, and using the labeled spindle vibration data after trend-term removing and low-pass filtering as an input signal of a milling force indirect measurement model for estimating a cutting force acting on the tool in real time for decoupled separation of a tool wear cutting force component;

step S7: inputting spindle data into a real-time milling force simulation model, and simulating the milling force online in combination with the tool-workpiece-engagement (TWE) and a milling force coefficient as a measured cutting force of a sharp tool;

step S8: converting each of a measured cutting force data segment and a simulated cutting force data segment into a frequency domain by Fast Fourier Transform, calculating spectrum energy sums within a frequency band interval of the two kinds of cutting forces respectively, and subtracting the simulated cutting force spectrum energy sum from the measured cutting force spectrum energy sum to obtain a spectrum energy sum reflecting the tool wear information;

Step S9: obtaining a cutting force ratio index by making a ratio based on the measured cutting force spectrum energy sum and the simulated cutting force spectrum energy sum, and monitoring a degradation state of the tool under a time-varying cutting operational condition by the cutting force ratio index;

Step S10: obtaining a maximum allowable theoretical cutting force increased due to tool wear at each position by making a difference with the simulated cutting force in step S7 based on the maximum allowable excitation force at each position during the cutting process of the part obtained in step S4; and Step S11: comparing the cutting force increased by the actual tool wear in step S8 with the maximum allowable theoretical cutting force increased by the tool wear in step S10, performing a tool change if the actual tool wear level is greater than the theoretically allowable tool wear level, otherwise continuing to monitor the tool wear state until the excessive wear occurs.

Further, the part surface roughness Ra is calculated by the following expression:

$$\begin{Bmatrix} F_x(j\omega) \\ F_y(j\omega) \end{Bmatrix} = \begin{bmatrix} H_{xx}(j\omega) & H_{xy}(j\omega) \\ H_{yx}(j\omega) & H_{yy}(j\omega) \end{bmatrix}^{-1} \cdot \begin{Bmatrix} X(j\omega) \\ Y(j\omega) \end{Bmatrix} \quad (1)$$

wherein $F_x$, $F_y$ represent the maximum allowable tool tip excitation force at each position of the part.

Further, the maximum allowable cutting force limit value due to tool wear is calculated by the following expression:

$$F_{MT-i} = F_i/\delta \qquad (2)$$

wherein $\delta$ represents an error correction coefficient taking machine tool geometry accuracy and dynamic accuracy performance into account.

Further, step 5 specifically includes acquiring spindle vibration and a displacement signal in the cutting process of the machine tool through a three-way acceleration sensor and an eddy current displacement sensor, and acquiring a spindle rotation speed, a feed speed, a tool tooth number, a tool name and spindle X/Y/Z coordinate data; correlating the sensor data with process instruction data by the tool name to form a data set with labeled tool name information.

Further, in step 7, on-line data of the spindle speed and feed speed is inputted into the real-time milling force simulation model.

Further, step 8 specifically includes:

step S8.1: ensuring that a data segment length is greater than or equal to a multiple of the data sampling frequency fs, making sufficient frequency resolution, when the cutting force frequency band is intercepted;

step S8.2: when the cutting force spectrum energy sum is calculated, selecting a frequency component within a valid frequency band interval, and ignoring a high frequency component, such as the frequency band interval being from 1 to 10 times the cutting frequency; and step S8.3: calculating a residual between the measured cutting force and the simulated cutting force directly by making a difference when the tool wear cutting force component is decoupled and separated; the expressions are as follows:

$$\Delta F_{x-wear}(j\omega) = \sum F_{x-mea}(j\omega) - \sum F_{x-pre}(j\omega) \qquad (3)$$

$$\Delta F_{y-wear}(j\omega) = \sum F_{y-mea}(j\omega) - \sum F_{y-pre}(j\omega)$$

wherein $\sum F_{i-mea}(j\omega)$ represents the measured cutting force spectrum energy sum; $\sum F_{i-pre}(j\omega)$ represents the simulated cutting force spectrum energy sum; and $\Delta F_{i-wear}(j\omega)$ represents the cutting force residual spectrum energy sum.

Further, the expression of the cutting force ratio is as follows:

$$K_{i-MFR}(j\omega) = \sum F_{i-mea}(j\omega)/\sum F_{i-pre}(j\omega) \qquad (4)$$

wherein $K_{i-MFR}(j\omega)$ represents a milling force ratio index and i represents three directions of X, Y, Z.

Further, the expression in step 10 is:

$$\begin{cases} \Delta F_{T-wear}(j\omega) = F_{MT-x}(j\omega) - F_{x-pre}(j\omega) \\ \Delta F_{T-wear}(j\omega) = F_{MT-y}(j\omega) - F_{y-pre}(j\omega) \\ \Delta F_{T-wear}(j\omega) = F_{MT-z}(j\omega) - F_{z-pre}(j\omega) \end{cases} \qquad (5)$$

Further, a tool wear monitoring system under variable operational conditions based on the decoupling of cutting force component includes:

a real-time cutting force simulation module: acquiring a tool location source file according to structural features of a part; inputting TLSF into a cutting physical simulation model to extract and calculate a tool-workpiece-engagement (TWE);

a cutting force indirect estimation module: acquiring a cross-point frequency response function FRF of a tool tip of a machine tool and a sensor mounting position by means of a hammer-hit method; calculating a maximum allowable tool tip excitation force at each position of the part during a cutting process based on the conversion of surface roughness Ra of a certain step of the machined part into a surface position error parameter SLE; calculating, based on a machine tool accuracy factor, a maximum allowable cutting force limit value due to tool wear; acquiring spindle vibration data of a cutting process of a numerical control machine tool, and establishing a data set with labeled tool name information according to the acquired data; performing trend-term removing and low-pass filtering on the labeled spindle vibration data, and using the labeled spindle vibration data after trend-term removing and low-pass filtering as an input signal of a milling force indirect measurement model for estimating a cutting force acting on the tool in real time for decoupled separation of a tool wear cutting force component; inputting spindle data into a real-time milling force simulation model, and simulating the milling force online in combination with the tool-workpiece-engagement (TWE) and a milling force coefficient as a measured cutting force of a sharp tool; converting each of a measured cutting force data segment and a simulated cutting force data segment into a frequency domain by Fast Fourier Transform, calculating the spectrum energy sums within a frequency band interval of the two kinds of cutting forces respectively, and subtracting the simulated cutting force spectrum energy sum from the measured cutting force spectrum energy sum to obtain a spectrum energy sum reflecting the tool wear information; and a cutting force ratio index construction module: obtaining a cutting force ratio index by making a ratio based on the measured cutting force spectrum energy sum and the simulated cutting force spectrum energy sum, and monitoring a degradation state of the tool under the time-varying cutting operational condition by the cutting force ratio index; obtaining a maximum allowable theoretical cutting force increased due to tool wear at each position by making a difference with the simulated cutting force based on the maximum allowable excitation force at each position during the cutting process of the part; and comparing the cutting force increased by the actual tool wear with the maximum allowable theoretical cutting force increased by the tool wear, performing a tool change if the actual tool wear level is greater than the theoretically allowable tool wear level, otherwise continuing to monitor the tool wear state until the excessive wear occurs.

Compared with the prior art, the present disclosure has the following technical effects:

The present disclosure proposes a tool wear monitoring method under variable operational conditions based on the decoupling of cutting force component. By collecting the process instruction data of the machine tool internal system in real time as the input of the instantaneous milling force model, the simulated and predicted cutting force without considering the effect of tool wear can be obtained. The vibration signal of the spindle is collected in real time by a three-way acceleration sensor installed on the side wall of the spindle, and the instantaneous cutting force is estimated by combining the frequency response function of the machine tool. Furthermore, the measured cutting force and the simulated cutting force are transformed into the frequency domain, and the cutting force component reflecting tool wear can be decoupled and separated by calculating the spectrum amplitude energy sum of the feature frequency band and the residual of the measured cutting force and the simulated cutting force respectively. The wear-induced cutting force components, which is obtained by a method that is completely different from the traditional signal processing method, is used to diagnose the tool degradation state, which is not disturbed by the cutting parameter. The monitoring index proposed based on the wear-induced cutting force shows a nonlinear monotone increasing trend, which is in good agreement with the curve of the tool wear degradation process. The method of demodulating the wear cutting force based on the frequency domain is different from the method of calculating the cross-correlation function in the time domain, and is basically free from interference from factors such as tool eccentricity.

Based on calculating the spectrum energy sum of each of the measured cutting force and the simulated cutting force, the disclosure can obtain the robust monitoring index reflecting the tool wear state by calculating the ratio of the spectrum energy sum of the measured cutting force and the spectrum energy sum of the simulated cutting force. The physical meaning of this index is very clear, and the size of the index indicates the degradation degree of the tool. When cutting with a new tool, the measured cutting force is basically equal to the simulated cutting force, and the cutting force ratio index is close to one. With the increase of tool wear, the measured cutting force deviates from the simulated cutting force gradually because of the component of tool wear and vibration, and the cutting force ratio index deviates from one gradually. Therefore, the tool wear monitoring under variable load can be realized by setting the appropriate monitoring threshold.

The interaction between the multi-tooth cutter and the workpiece generates a periodic excitation force, and the forced vibration acting on the process system is one of the key factors affecting the surface roughness of the workpiece. The maximum allowable cutting force at the tool tip can be calculated by the surface roughness Ra of the part and the frequency response function of the tool tip. By calculating the residual between the maximum allowable cutting force and the simulated cutting force under the selected cutting parameter, the maximum allowable cutting force increased by tool wear can be separated. Therefore, real-time evaluation of the maximum wear cutting force can be used as a reference standard to evaluate whether the tool can continue machining. Tool wear threshold can be dynamically adjusted by the cutting accuracy of parts, and the tools judged to be invalid in finish machining can continue to participate in cutting in rough machining, which makes full use of the life of tool and considers the machining accuracy of parts.

BRIEF DESCRIPTION OF DRAWINGS

In order to illustrate the technical solutions of the embodiments of the present disclosure more clearly, the drawings required for use in the embodiments will be briefly described below, the following drawings illustrate only certain embodiments of the present disclosure and are therefore not to be considered as limiting the scope, and further related drawings can be derived therefrom by those of ordinary skill in the art without inventive step.

Figure 1:
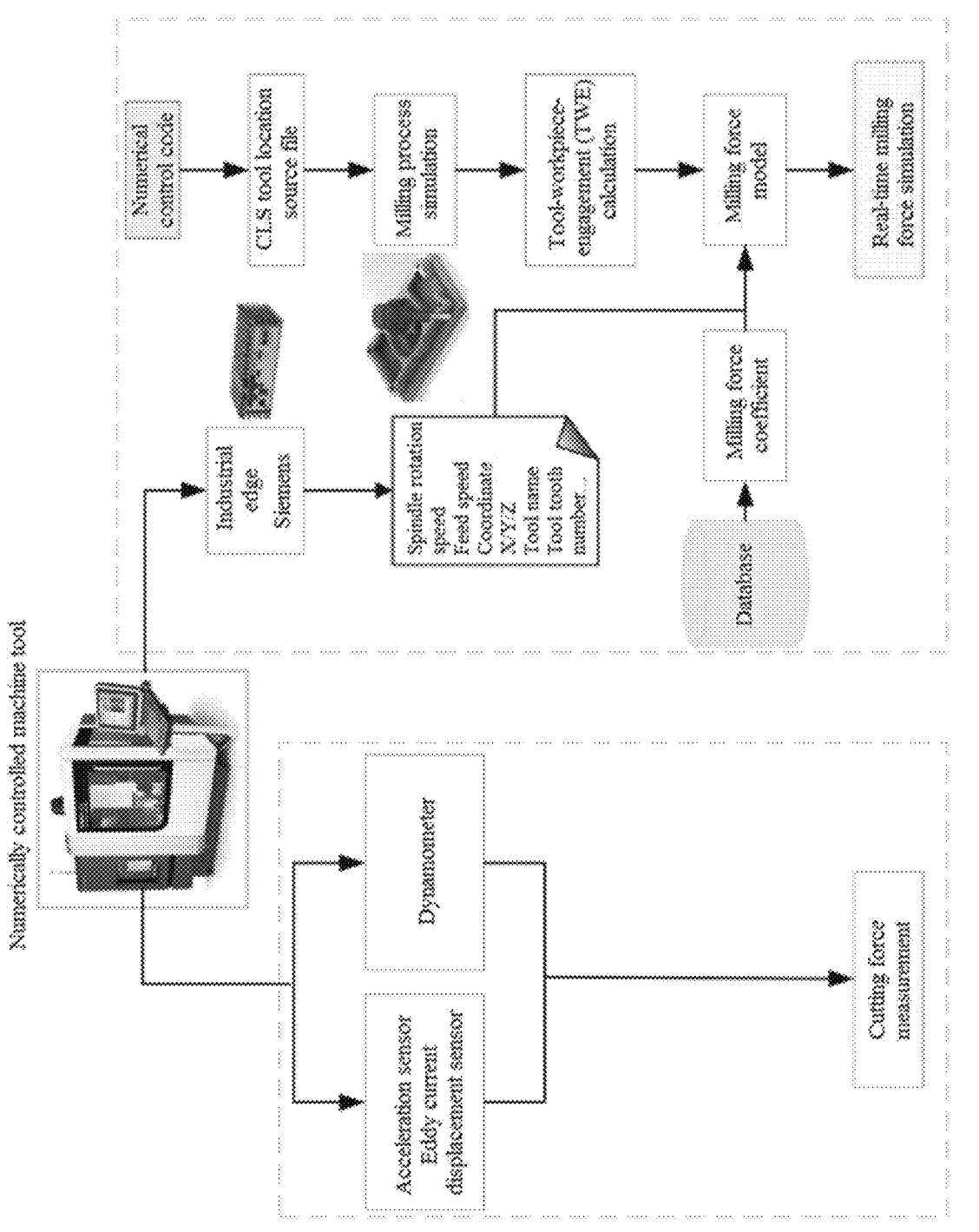

FIG. 1 is a schematic diagram of acquisition of the simulated cutting force and the measured cutting force.

Figure 2:
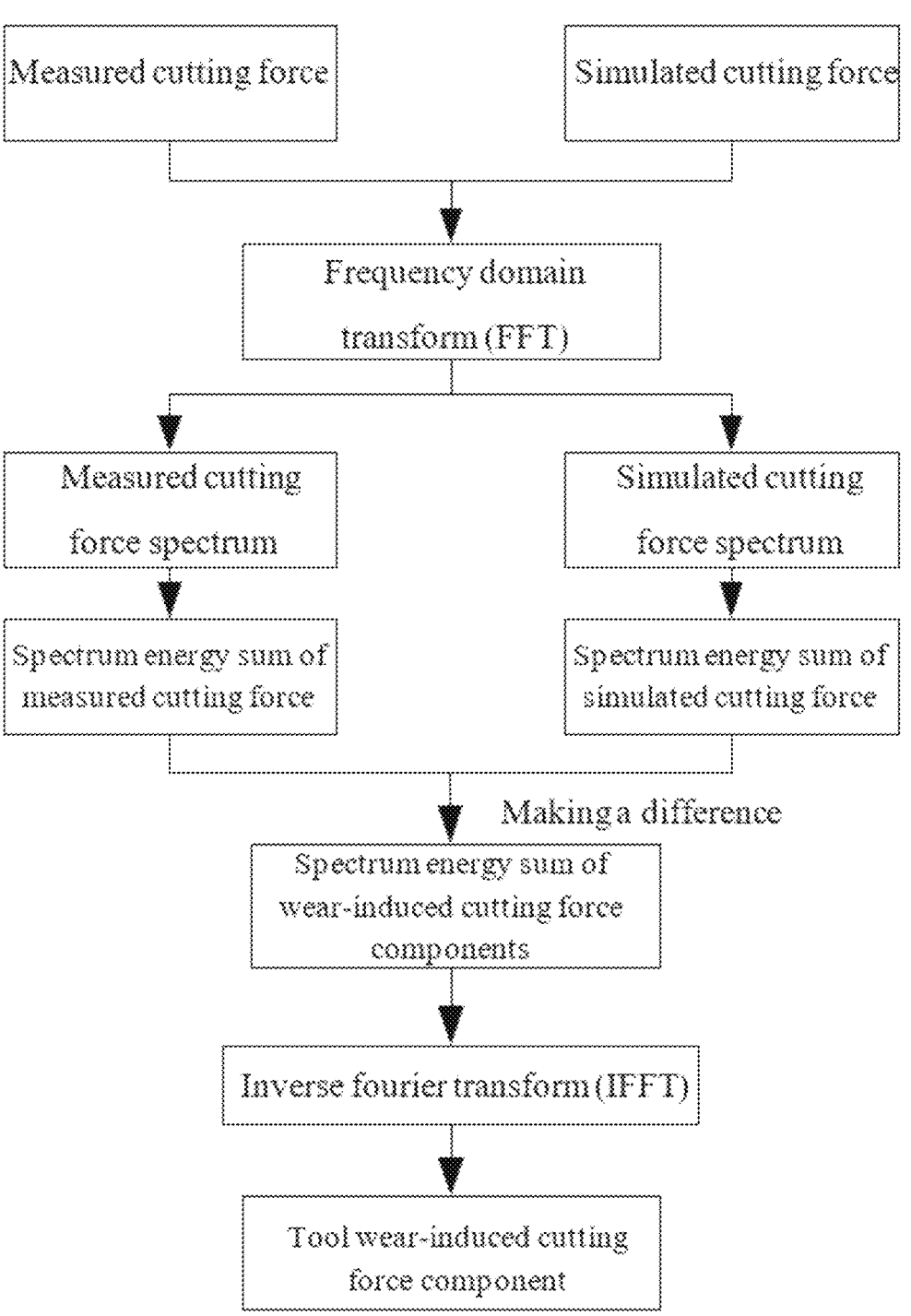

FIG. 2 is a schematic diagram of demodulation and separation of the wear-induced cutting force components.

Figure 3:
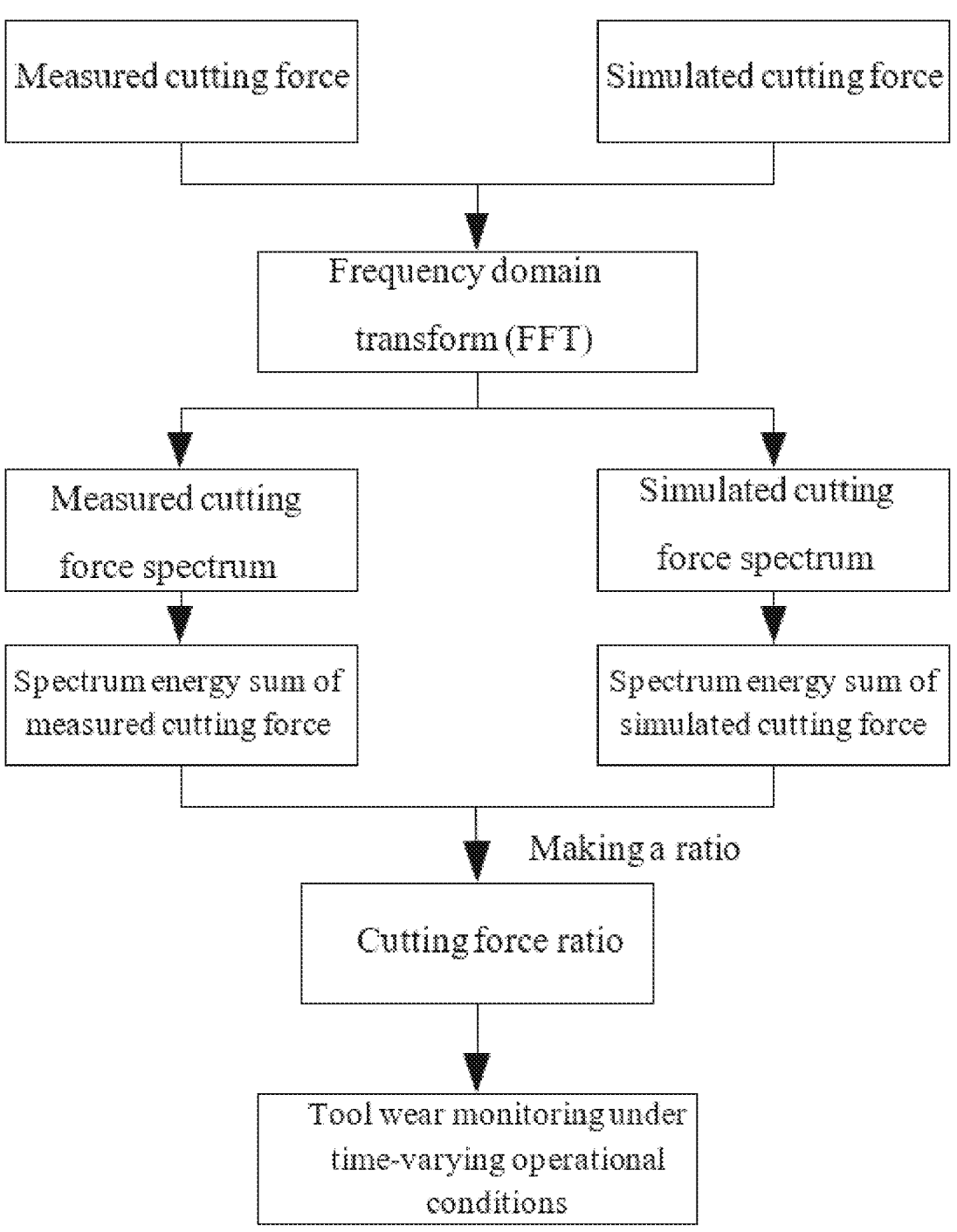

FIG. 3 is a schematic diagram of the configuration of the cutting force ratio index.

Figure 4:
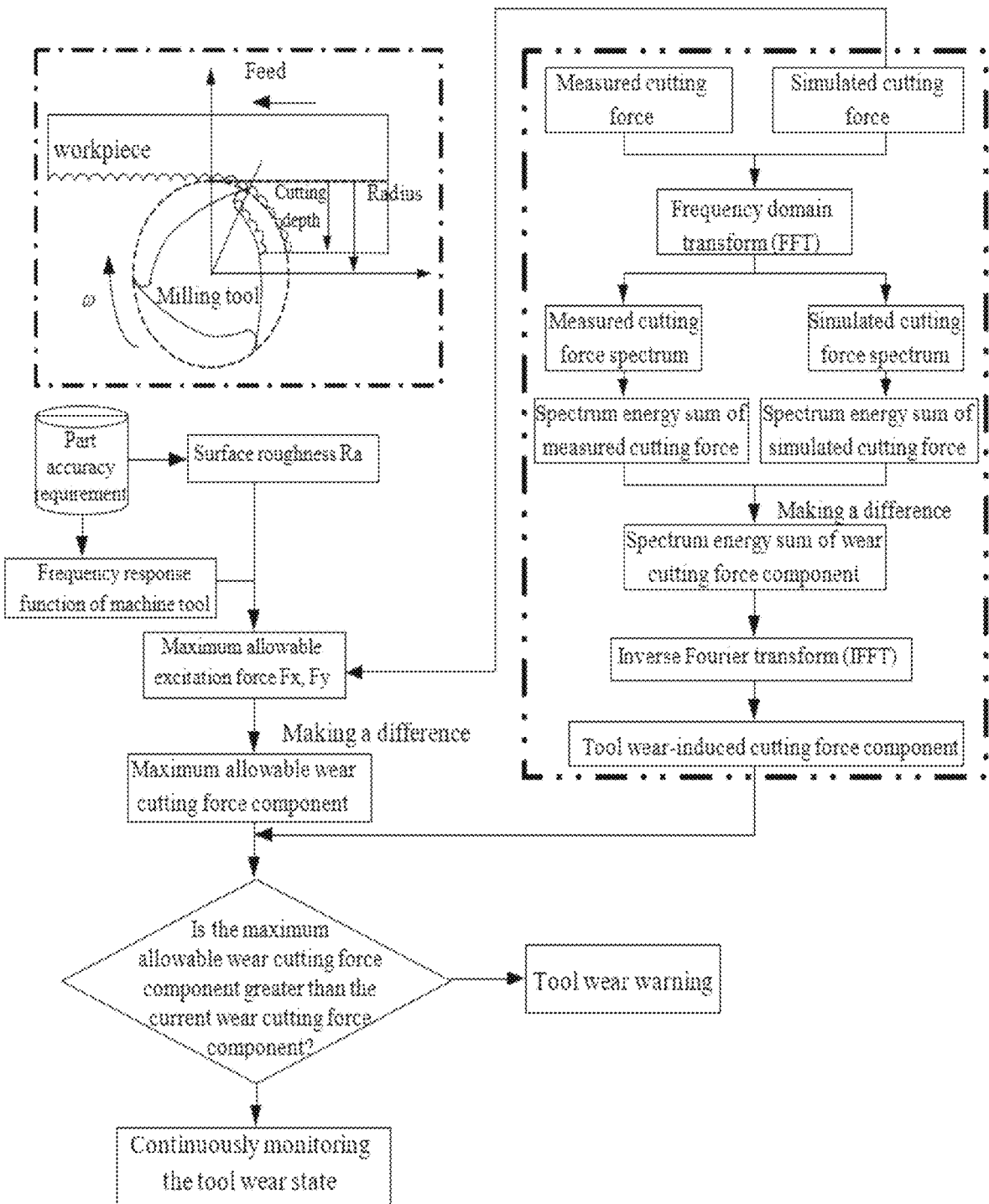

FIG. 4 is a schematic diagram of dynamic evaluation of the tool failure threshold.

Figure 5:
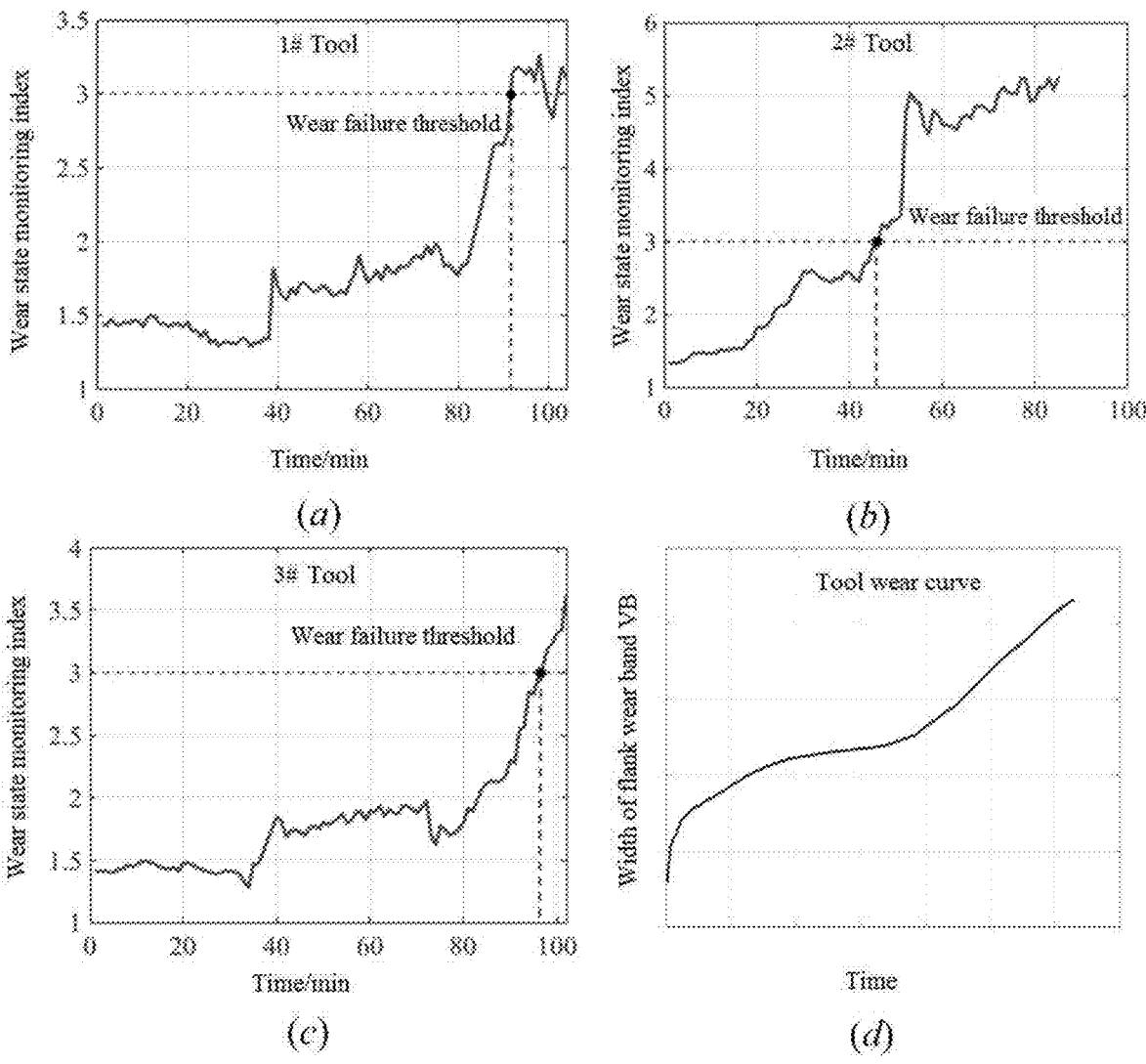

In FIG. 5, (*a*) to (*d*) are the cutting force ratio index representing the tool wear degradation process.

DETAILED DESCRIPTION OF THE
EMBODIMENTS

In order to make the objectives, technical solutions, and advantages of the embodiments of the present disclosure clearer, the technical solutions of the embodiments of the present disclosure will be clearly and completely described below in conjunction with the accompanying drawings of the embodiments of the present disclosure, it is obvious that the described embodiments are some, but not all, of the embodiments of the present disclosure. The components of the embodiments of the present disclosure generally described and illustrated in the drawings herein could be arranged and designed in a wide variety of different configurations.

Thus, the following detailed description of the embodiments of the disclosure, as provided in the drawings, is not intended to limit the scope of the disclosure, but is merely representative of selected embodiments of the disclosure. Based on the embodiments in the present disclosure, all other embodiments obtained by those of ordinary skill in the art without making inventive labor belong to the scope of protection of the present disclosure.

It should be noted that like reference numerals and letters represent like items in the following drawings, and therefore, once an item is defined in one drawing, it need not be further defined and explained in subsequent drawings.

In the description of the embodiments of the present disclosure, it should be noted that the terms "up", "down", "horizontal", "inside" and so on, indicating an orientation or positional relationship based on the orientation or positional relationship shown in the drawings, or the orientation or positional relationship commonly placed when the product of the disclosure is used, are only for the convenience of describing the disclosure and simplifying the description, and are not intended to indicate or imply that the device or element referred to must have a specific orientation, be constructed and operated in a specific orientation, and therefore cannot be understood as a limitation to the disclosure. Furthermore, the terms "first", "second", etc., are used only to distinguish descriptions and cannot be understood to indicate or imply relative importance.

In addition, if the term "horizontal" appears, it does not mean that the component is required to be horizontal, but can be slightly tilted. For example, "horizontal" only means that its direction is more horizontal than "vertical", which does not mean that the structure must be completely horizontal, but can be slightly tilted.

In the description of embodiments of the present disclosure, it should also be noted that unless otherwise expressly specified and limited, the terms "set", "installed", "connected" and "connection" should be understood in a broad sense, for example, it can be fixed connection, detachable connection or integrated connection; it can be mechanical connection or electrical connection; it can be directly connected or indirectly connected through an intermediate medium, and it can be the internal communication of two elements. The specific meanings of the above terms in the present disclosure may be understood by those of ordinary skill in the art on a case-by-case basis.

The disclosure is described in further detail below with reference to the accompanying drawings:

The present disclosure proposes a tool wear monitoring method under variable operational conditions based on the decoupling of cutting force component to address the disturbing effects of time-varying cutting parameters on tool wear monitoring. The implementation of the tool wear monitoring method specifically includes the following steps.

Step S1: as shown in FIG. 1, before the part is machined, the part is first 3D modeled by UG NX software, and then reasonable process parameters and process steps are selected according to machining conditions and quality requirements. A part machining process G-code is generated, a numerical control programming link is completed, and a TLSF is obtained.

Step S2: as shown in FIG. 1, cutting parameter information such as parts and tools is defined in the cutting process simulation software such as MACHGpro (MACHPROT™ is the most advanced process simulation and NC program optimization software, developed by MAL Lab.), and the TLSF obtained in step S1 is imported, and physical and geometric information such as the cutting force, tool vibration and material removal rate during the cutting process is generated by off-line simulation. At the same time, the tool-workpiece-engagement (TWE) obtained by simulation facilitates the subsequent real-time simulation calculation of the cutting force.

Step S3: by means of a hammer-hit method, a cross-point frequency response function FRF of a tool tip of a machine tool and a sensor mounting position is acquired through the LMS Test. Lab system.

Step S4: a maximum allowable tool tip excitation force at each position of the part during a cutting process is calculated based on the conversion of surface roughness Ra of a certain step of the machined part into a surface position error parameter. The part surface roughness Ra is calculated by the following expression:

$$\left\{ \begin{array}{c} F_x(j\omega) \\ F_y(j\omega) \end{array} \right\} = \left[ \begin{array}{cc} H_{xx}(j\omega) & H_{xy}(j\omega) \\ H_{yx}(j\omega) & H_{yy}(j\omega) \end{array} \right]^{-1} \cdot \left\{ \begin{array}{c} X(j\omega) \\ Y(j\omega) \end{array} \right\} \qquad (1)$$

wherein $F_x$, $F_y$ represent the maximum allowable tool tip excitation force at each position of the part.

Step S5: the tool wear factor is only one of the key factors forming machining precision. The safety factor is considered based on the combination of a machine geometry error and dynamic accuracy, a machine tool accuracy factor is formed according to expert experience to calculate the maximum allowable cutting force limit value due to tool wear. The calculation is expressed as:

$$F_{MT-i} = F_i/\delta \qquad (2)$$

wherein $\delta$ represents an error correction coefficient taking machine tool geometry accuracy and dynamic accuracy performance into account.

Step S6: as shown in FIG. 1, spindle vibration and a displacement signal in the cutting process of the machine tool are acquired through a three-way acceleration sensor, an eddy current displacement sensor, and the like, and a spindle rotation speed, a feed speed, a tool tooth number, a tool name, and spindle X/Y/Z coordinate data are acquired by a Siemens edge calculation module.

Step S7: the sensor data is correlated with process instruction data by the tool name, and a data set with labeled tool name information is formed.

Step S8: trend-term removing and low-pass filtering are performed on the labeled spindle vibration data, and the labeled spindle vibration data after trend-term removing and low-pass filtering is used as an input signal of a milling force indirect measurement model for estimating a cutting force acting on the tool in real time for decoupled separation of a tool wear cutting force component.

Step S9: as shown in FIG. 1, the on-line data, such as the spindle speed and the feed speed are inputted into the real-time milling force simulation model, and the milling force is simulated online in combination with the tool-workpiece-engagement (TWE) and the milling force coefficient, etc., and the simulated milling force can be regarded as the measured cutting force of the sharp tool because the tool wear effect is not considered.

Step S10: as shown in FIG. 2, each of a measured cutting force data segment and a simulated cutting force data segment is converted into the frequency domain by Fast Fourier Transform, the spectrum energy sums within a frequency band interval of the two kinds of cutting forces are calculated respectively, and the simulated cutting force spectrum energy sum is subtracted from the measured cutting force spectrum energy sum to obtain a spectrum energy sum reflecting the tool wear information.

Preferably, step S10 includes:

Step S10.1: when the cutting force frequency band is intercepted, a data segment length is ensured to be greater than or equal to a multiple of the data sampling frequency fs, making sufficient frequency resolution.

Step S10.2: when the cutting force spectrum energy sum is calculated, a frequency component within a valid frequency band interval is selected, and a high frequency component is ignored, such as the frequency band interval being from 1 to 10 times the cutting frequency.

Step S10.3: a residual between the measured cutting force and the simulated cutting force is calculated directly by making a difference when the tool wear cutting force component is decoupled and separated. The expressions are as follows:

$$\Delta F_{x-wear}(j\omega) = \sum F_{x-mea}(j\omega) - \sum F_{x-pre}(j\omega) \qquad (3)$$

$$\Delta F_{y-wear}(j\omega) = \sum F_{y-mea}(j\omega) - \sum F_{y-pre}(j\omega)$$

wherein $\Sigma F_{i-mea}(j\omega)$ represents the measured cutting force spectrum energy sum; $\Sigma F_{i-pre}(j\omega)$ represents the simulated cutting force spectrum energy sum; and $\Delta F_{i-wear}(j\omega)$ represents the residual cutting force spectrum energy sum.

Step S11: as shown in FIG. 2, based on the measured cutting force spectrum energy sum and the simulated cutting force spectrum energy sum, a cutting force ratio index is obtained by making a ratio, and a degradation state of the tool under the time-varying cutting condition is monitored by the cutting force ratio index.

$$K_{i-MFR}(j\omega) = \sum F_{i-mea}(j\omega)/\sum F_{i-pre}(j\omega) \qquad (4)$$

wherein $K_{i-MFR}(j\omega)$ represents a milling force ratio index and i represents three directions of X, Y, Z.

Step S12: as shown in FIG. 4, a maximum allowable theoretical cutting force increased due to tool wear at each position is obtained by making a difference with the simulated cutting force in step S9 based on the maximum allowable excitation force at each position during the cutting process of the part obtained in step S5.

$$\begin{cases} \Delta F_{T-wear}(j\omega) = F_{MT-x}(j\omega) - F_{x-pre}(j\omega) \\ \Delta F_{T-wear}(j\omega) = F_{MT-y}(j\omega) - F_{y-pre}(j\omega) \,. \\ \Delta F_{T-wear}(j\omega) = F_{MT-z}(j\omega) - F_{z-pre}(j\omega) \end{cases} \qquad (5)$$

Step S13: the cutting force increased by the actual tool wear in step S10 is compared with the maximum allowable theoretical cutting force increased by the tool wear in step S12, a tool change is performed if the actual tool wear level is greater than the theoretically allowable tool wear level, otherwise the tool wear state is continuously monitored until the excessive wear occurs.

Step S14: by carrying out the above method, the cutting force ratio index variation curves of three end mills during wear evolution under time-varying operational conditions are obtained as shown in FIG. 5. The parameters of the cutting conditions experienced during the life cycle of the end mill are shown in Table 1 below:

TABLE 1

| | | | | | | | Material removal |
| | | Rota- | | | | Feed | rate |
| | Cutting | tion | Feed | Cutting | Cutting | per | mm³/ |
| | condi- | speed | mm/ | width | depth | tooth | min |
| Tool | tions | r/min | min | mm | mm | mm/r | |
|---|---|---|---|---|---|---|---|
| Tool # | C1 | 600 | 120 | 2 | 3 | 0.050 | 720 |
| 1 | C2 | 1200 | 144 | 4 | 3 | 0.030 | 1728 |
| | C3 | 900 | 200 | 5 | 3 | 0.056 | 3000 |
| Tool 2 | C1 | 900 | 200 | 5 | 3 | 0.056 | 3000 |
| # | C2 | 900 | 180 | 3 | 3 | 0.050 | 1620 |
| | C3 | 1200 | 144 | 1 | 3 | 0.030 | 432 |
| Tool # | C1 | 600 | 120 | 2 | 3 | 0.050 | 720 |
| 3 | C2 | 1200 | 144 | 4 | 3 | 0.030 | 1728 |
| | C3 | 600 | 120 | 5 | 3 | 0.050 | 1800 |

A tool wear monitoring system under variable operational conditions based on the decoupling of cutting force component, including:

M1: a multi-source data acquisition and pre-processing module:

the data sources of the cutting process of the numerically controlled machine tool mainly include the data of the external acceleration sensor and the data of the numerical control system of the machine tool. The three-dimensional acceleration sensor and the eddy current displacement sensor collect X/Y/Z vibration and displacement data of the spindle. Based on a Siemens edge calculation module, the data of the numerical control system of the machine tool is collected, including cutting data (spindle speed and feed speed), X/Y/Z coordinate data of the machine tool spindle, tool name, program name, current program line and tool tooth number. The tool name and the program name are used to mark and match monitoring data with tools. Hardware of the data acquisition system includes a numerical control machining center with the Siemens edge calculation module, the three-way acceleration sensor, the eddy current displacement sensor, the data acquisition and calculation integrated machine, the LabVIEW data acquisition and condition monitoring software.

M2: a cutting force real-time simulation module:

a numerical control code is obtained based on CAM software such as UG NX, MasterCAM, and the like, and the TLSF for part machining is generated. The tool-workpiece-engagement (TWE) is quickly extracted and calculated by inputting the TLSF into the cutting physical simulation model. The on-line simulation of cutting force can be realized by taking the calculated tool-workpiece-engagement region, spindle speed collected in real time, feed speed data and cutting force coefficient as the input of the cutting force model and the instantaneous cutting force as the output of the model. Considering the calculation efficiency, the tool-workpiece-engagement (TWE) can be calculated by MACHpro and other cutting process simulation software (Vericut) in real-time simulation of cutting force. The expressions of a cutting force infinitesimal element are:

$$\begin{bmatrix} dF_{rj}(\phi, z) \\ dF_{tj}(\phi, z) \\ dF_{aj}(\phi, z) \end{bmatrix} = \begin{bmatrix} K_{re} \\ K_{ae} \\ K_{te} \end{bmatrix} dS(z) + \begin{bmatrix} K_{rc} \\ K_{ac} \\ K_{tc} \end{bmatrix} h_j(\phi, z) dS(z) \qquad (6)$$

$$\begin{bmatrix} dF_{xj}(\phi, z) \\ dF_{yj}(\phi, z) \\ dF_{zj}(\phi, z) \end{bmatrix} = \begin{bmatrix} -\sin\kappa\sin\phi_j & -\cos\phi_j & -\cos\kappa\sin\phi_j \\ -\sin\kappa\cos\phi_j & \sin\phi_j & -\cos\kappa\cos\phi_j \\ \cos\kappa & 0 & -\sin\kappa \end{bmatrix} \begin{bmatrix} dF_{rj}(\phi, z) \\ dF_{tj}(\phi, z) \\ dF_{aj}(\phi, z) \end{bmatrix} \qquad (7)$$

M3: a cutting force indirect estimation module:

indirect estimation of the cutting force needs the frequency response function of machine tool and tool vibration displacement data. The frequency response function is obtained by a hammer-hit method. Hammer-hit experiments are carried out along the feed direction of spindle and along a direction perpendicular to the feed direction respectively, and several groups of force-acceleration FRFs are obtained. The FRFs in each direction are averaged to obtain the cross-point frequency response function from the tool tip to the sensor mounting position. The tool displacement data is obtained by quadratic integration of acceleration data, fast Fourier transform (FFT) is performed on the tool tip displacement, and the cross-point frequency response function of the machine tool is interpolated. The cutting force spectrum can be obtained by calculating the ratio of the tool tip displacement to the frequency response function, and the real dynamic cutting force in the cutting process is calculated by inverse Fourier transform (IFFT) on the estimated cutting force spectrum. The indirect estimation expression of the cutting force is:

$$\begin{bmatrix} F_x(j\omega) \\ F_y(j\omega) \end{bmatrix} = \begin{bmatrix} H_{xx}(j\omega) & H_{xy}(j\omega) \\ H_{yx}(j\omega) & H_{yy}(j\omega) \end{bmatrix}^{-1} \begin{bmatrix} X(j\omega) \\ Y(j\omega) \end{bmatrix} \quad (8)$$

M4: a cutting force frequency domain decoupled separation module the cutting force decoupled separation module is aimed at extracting and separating the cutting force component increased due to tool wear from the measured cutting force. The data segments associated with the acquired measured cutting force and simulated cutting force are intercepted by means of a sliding window, and then the cutting forces in the time domain are transformed into the frequency domain. Considering the influence of high frequency noise interference, the cutting force spectrum in the characteristic frequency band of the cutting force spectrum is selected to calculate the amplitude energy sum. By subtracting the simulated cutting force spectrum energy sum from the measured cutting force spectrum energy sum, the spectrum energy sum of the cutting force increased by tool wear can be obtained.

M5: a cutting force ratio index construction module

A cutting force ratio index is obtained by calculating the ratio of the measured cutting force spectrum energy sum to the simulated cutting force spectrum energy sum in the frequency domain. The cutting force ratio index can effectively reflect the level of tool wear without interference from cutting parameters. The cutting force ratio index fluctuates above and below one as the new tool cuts, and the cutting force ratio index gradually deviates from one as the level of tool wear increases. The expression of the cutting force ratio is:

$$K_{i-MFR}(j\omega) = \sum F_{i-mea}(j\omega) / \sum F_{i-pre}(j\omega) \quad (4)$$

wherein $K_{i-MFR}(j\omega)$ represents a milling force ratio index and i represents three directions of X, Y, Z.

M6: a tool failure threshold dynamic adjustment module

Based on the surface roughness Ra value of the part, the maximum cutting force allowable for the tool to achieve the surface accuracy of the part under forced vibration can be solved in combination with the FRF of the machine tool. The cutting force generated by the actual cutting of the tool is a linear superposition of the simulated cutting force and the component of the cutting force increased by tool wear. By calculating the simulated cutting force under the used cutting parameters, in combination with the maximum cutting force allowable for the tool to complete the surface accuracy Ra of the part under forced vibration, the maximum wear level allowable for the current tool to complete the machining of the part, i.e., the maximum allowable value of the wear cutting force through decoupling, can be solved. Thus, by constraining the threshold of wear-induced cutting force components in real time, the wear threshold can be dynamically adjusted according to rough and finish machining requirements of the part. The expressions of the surface location error and resultant cutting force resulting from the forced vibration are:

$$\begin{Bmatrix} X(j\omega) \\ Y(j\omega) \end{Bmatrix} = \begin{bmatrix} H_{xx}(j\omega) & H_{xy}(j\omega) \\ H_{yx}(j\omega) & H_{yy}(j\omega) \end{bmatrix} \cdot \begin{Bmatrix} F_x(j\omega) \\ F_y(j\omega) \end{Bmatrix} \quad (9)$$

-continued $$\begin{cases} F_x(j\omega) = F_{x-pre}(j\omega) + \Delta F_{x-wear}(j\omega) \\ F_y(j\omega) = F_{y-pre}(j\omega) + \Delta F_{y-wear}(j\omega) \\ F_z(j\omega) = F_{z-pre}(j\omega) + \Delta F_{z-wear}(j\omega) \end{cases} \quad (10)$$

M7: a cutting condition definition database the cutting condition definition database is used to store relevant data for implementing the tool wear monitoring proposed by the present disclosure. In the cutting force real-time simulation module, a specific name of each tool of the same size needs to be stored, so that the monitoring system can match the corresponding tool parameters based on the read tool name and the corresponding milling force coefficients based on the tool-workpiece relationship. In the tool wear threshold dynamic adjustment module, the requirements for the surface roughness Ra of the part at different steps are stored and matched to the surface roughness of the part at that process and step based on the program name, the current program line, and the like. The cutting force increased according to the maximum tool wear allowable by the surface roughness Ra is calculated, and whether the current tool is in a wear failure state is determined in real time.

The foregoing is merely a preferred embodiment of the present disclosure and is not intended to limit the present disclosure, and various modifications and variations of the present disclosure will be apparent to those skilled in the art. Any modifications, equivalents, modifications, etc., made within the spirit and principles of the present disclosure shall be included within the scope of protection of the present disclosure.

What is claimed is:

1. A tool wear monitoring method under variable operational conditions based on the decoupling of cutting force component, comprising the steps of:

step S1: acquiring a tool location source file (TLSF) according to structural features of a part;

step S2: inputting TLSF into a cutting physical simulation model to extract and calculate a tool-workpiece-engagement (TWE);

step S3: acquiring a cross-point frequency response function FRF of a tool tip of a machine tool and a sensor mounting position by carrying out a hammer-hit experiment to a tool of the machine tool along a feed direction of machine tool spindle and along a direction perpendicular to the feed direction respectively;

step S4: calculating a maximum allowable tool tip excitation force at each position of the part during a cutting process based on the conversion of surface roughness Ra of a certain step of the machined part into a surface position error parameter SLE; calculating, based on a machine tool accuracy factor, a maximum allowable cutting force limit value due to tool wear;

step S5: acquiring spindle vibration and a displacement signal in the cutting process of the machine tool through a three-way acceleration sensor and an eddy current displacement sensor, and acquiring a spindle rotation speed, a feed speed, a tool tooth number, a tool name and spindle X/Y/Z coordinate data; and correlating sensor data with process instruction data by the tool name to form a data set with labeled tool name information as spindle vibration data of a cutting process of a numerically controlled machine tool, and establishing a data set with labeled tool name information according to the acquired data;

step S6: performing trend-term removing and low-pass filtering on the labeled spindle vibration data, and using the labeled spindle vibration data after trend term removing and low-pass filtering as an input signal for a milling force indirect measurement model for estimating a cutting force acting on the tool in real time for decoupled separation of a tool wear cutting force component;

step S7: inputting cutting parameter data of the machine tool into a real-time milling force simulation model in real time, and simulating the milling force online in combination with the tool-workpiece-engagement (TWE) and a milling force coefficient as a measured cutting force of a sharp tool;

step S8: converting each of a measured cutting force data segment and a simulated cutting force data segment into a frequency domain by Fast Fourier Transform, calculating spectrum energy sums within a frequency band interval of the two kinds of cutting forces respectively, and subtracting the simulated cutting force spectrum energy sum from the measured cutting force spectrum energy sum to obtain a spectrum energy sum reflecting tool wear information;

step S9: obtaining a cutting force ratio index by making a ratio based on the measured cutting force spectrum energy sum and the simulated cutting force spectrum energy sum, and monitoring a degradation state of the tool under a time-varying cutting operational condition by the cutting force ratio index;

step S10: obtaining a maximum allowable theoretical cutting force increased due to tool wear at each position by making a difference with the simulated cutting force in step S7 based on the maximum allowable excitation force at each position during the cutting process of the part obtained in step S4; and step S11: comparing the cutting force increased by the actual tool wear in step S8 with the maximum allowable theoretical cutting force increased by the tool wear in step S10, performing a tool change of the machine tool under the condition that the actual tool wear level is greater than the theoretically allowable tool wear level, otherwise continuing to monitor a tool wear state of the machine tool until the excessive wear occurs.

2. The tool wear monitoring method under variable operational conditions based on the decoupling of cutting force component according to claim 1, wherein the part surface roughness Ra is calculated by the following expression:

$$\begin{Bmatrix} F_x(j\omega) \\ F_y(j\omega) \end{Bmatrix} = \begin{bmatrix} H_{xx}(j\omega) & H_{xy}(j\omega) \\ H_{yx}(j\omega) & H_{yy}(j\omega) \end{bmatrix}^{-1} \cdot \begin{Bmatrix} X(j\omega) \\ Y(j\omega) \end{Bmatrix} \quad 1)$$

wherein $F_x$, $F_y$ represent the maximum allowable tool tip excitation force at each position of the part, X, Y represent the tool tip displacement, and $H_{ij}$ represents the machine frequency response.

3. The tool wear monitoring method under variable operational conditions based on the decoupling of cutting force component according to claim 1, wherein the maximum allowable cutting force limit value due to tool wear is calculated by the following expression:

$$F_{MT-i}=F_i/\delta \quad 2)$$

wherein $\delta$ represents an error correction coefficient taking machine tool geometry accuracy and dynamic accuracy performance into account.

4. The tool wear monitoring method under variable operational conditions based on the decoupling of cutting force component according to claim 1, wherein in step 7, on-line data of the spindle speed and feed speed is inputted into the real-time milling force simulation model.

5. The tool wear monitoring method under variable operational conditions based on the decoupling of cutting force component according to claim 1, wherein step 8 specifically comprises:

step S8.1: ensuring that a data segment length is greater than or equal to a multiple of the data sampling frequency fs, making sufficient frequency resolution, when the cutting force frequency band is intercepted;

step S8.2: selecting a frequency component within a valid frequency band interval, and ignoring a high frequency component, when the cutting force spectrum energy sum is calculated; and step S8.3: calculating a residual between the measured cutting force and the simulated cutting force directly by making a difference when the tool wear cutting force component is decoupled and separated; the expressions are as follows:

$$\Delta F_{x-wear}(j\omega) = \sum F_{x-mea}(j\omega) - \sum F_{x-pre}(j\omega) \quad 3)$$
$$\Delta F_{y-wear}(j\omega) = \sum F_{y-mea}(j\omega) - \sum F_{y-pre}(j\omega)$$

wherein $\Sigma F_{i-mea}(j\omega)$ represents the measured cutting force spectrum energy sum; $\Sigma F_{i-pre}(j\omega)$ represents the simulated cutting force spectrum energy sum; and $\Delta F_{i-wear}(j\omega)$ represents the cutting force residual spectrum energy sum.

6. The tool wear monitoring method under variable operational conditions based on the decoupling of cutting force component according to claim 1, wherein the expression of the cutting force ratio is as follows:

$$K_{i-MFR}(j\omega) = \sum F_{i-mea}(j\omega)/\sum F_{i-pre}(j\omega) \quad 4)$$

wherein $K_{i-MFR}(j\omega)$ represents a milling force ratio index and i represents three directions of X, Y, Z.

7. The tool wear monitoring method under variable operational conditions based on the decoupling of cutting force component according to claim 1, wherein the expression in step 10 is:

$$\begin{cases} \Delta F_{T-wear}(j\omega) = F_{MT-x}(j\omega) - F_{x-pre}(j\omega) \\ \Delta F_{T-wear}(j\omega) = F_{MT-y}(j\omega) - F_{y-pre}(j\omega) \,. \\ \Delta F_{T-wear}(j\omega) = F_{MT-z}(j\omega) - F_{z-pre}(j\omega) \end{cases} \quad 5)$$

8. A tool wear monitoring system under variable operational conditions based on the decoupling of cutting force component, comprising:

a real-time cutting force simulation module: acquiring a tool location source file according to structural features of a part; inputting TLSF into a cutting physical simulation model to extract and calculate a tool-workpiece-engagement (TWE);

a cutting force indirect estimation module: acquiring a cross-point frequency response function FRF of a tool tip of a machine tool and a sensor mounting position by carrying out a hammer-hit experiment to the machine tool along a feed direction of machine tool spindle and along a direction perpendicular to the feed direction respectively; calculating a maximum allowable tool tip excitation force at each position of the part during a cutting process based on the conversion of surface roughness Ra of a certain step of the machined part into a surface position error parameter SLE; calculating, based on a machine tool accuracy factor, a maximum allowable cutting force limit value due to tool wear; acquiring spindle vibration and a displacement signal in the cutting process of the machine tool through a three-way acceleration sensor and an eddy current displacement sensor, and acquiring a spindle rotation speed, a feed speed, a tool tooth number, a tool name and spindle X/Y/Z coordinate data; and correlating sensor data with process instruction data by the tool name to form a data set with labeled tool name information as spindle vibration data of a cutting process of a numerically controlled machine tool, and establishing a data set with labeled tool name information according to the acquired data; performing trend-term removing and low-pass filtering on the labeled spindle vibration data, and using the labeled spindle vibration data after trend-term removing and low-pass filtering as an input signal of a milling force indirect measurement model for estimating a cutting force acting on the tool in real time for decoupled separation of a tool wear cutting force component; inputting spindle data into a real-time milling force simulation model, and simulating the milling force online in combination with the tool-workpiece-engagement (TWE) and a milling force coefficient as a measured cutting force of a sharp tool; converting each of a measured cutting force data segment and a simulated cutting force data segment into a frequency domain by Fast Fourier Transform, calculating spectrum energy sums within a frequency band interval of the two kinds of cutting forces respectively, and subtracting the simulated cutting force spectrum energy sum from the measured cutting force spectrum energy sum to obtain a spectrum energy sum reflecting tool wear information; and a cutting force ratio index construction module: obtaining a cutting force ratio index by making a ratio based on the measured cutting force spectrum energy sum and the simulated cutting force spectrum energy sum, and monitoring a degradation state of the tool under a time-varying cutting operational condition by the cutting force ratio index; obtaining a maximum allowable theoretical cutting force increased due to tool wear at each position by making a difference with the simulated cutting force based on the maximum allowable excitation force at each position during the cutting process of the part; and comparing the cutting force increased by the actual tool wear with the maximum allowable theoretical cutting force increased by the tool wear, performing a tool change of the machine tool under the condition that the actual tool wear level is greater than the theoretically allowable tool wear level, otherwise continuing to monitor a tool wear state of the machine tool until the excessive wear occurs.

\* \* \* \* \*